(12) United States Patent
Chen

(10) Patent No.: US 6,401,895 B1
(45) Date of Patent: Jun. 11, 2002

(54) FREEWHEELING HUB DEVICE FOR A BICYCLE

(75) Inventor: Hubert Chen, Taichung Hsien (TW)

(73) Assignee: Kun Teng Industry Co., Ltd., Taichung Hsien (TW)

( * ) Notice: Subject to any disclaimer, the term of this patent is extended or adjusted under 35 U.S.C. 154(b) by 0 days.

(21) Appl. No.: 09/761,908

(22) Filed: Jan. 17, 2001

(51) Int. Cl.[7] .............................................. F16D 23/00
(52) U.S. Cl. ........................ 192/64; 192/94; 301/110.5
(58) Field of Search ........................ 192/64, 94, 54.51; 301/110.5

(56) References Cited

U.S. PATENT DOCUMENTS

| | | | | |
|---|---|---|---|---|
| 1,376,033 A | * | 4/1921 | Page | 192/12 B |
| 5,642,796 A | * | 7/1997 | Tabe | 192/45 |
| 5,669,477 A | * | 9/1997 | Chen | 192/41 S |
| 5,718,315 A | * | 2/1998 | Chen | 192/45.1 |
| 6,004,240 A | * | 12/1999 | Tabe | 192/64 |
| 6,030,052 A | * | 2/2000 | Watarai et al. | 301/110.5 |
| 6,244,405 B1 | * | 6/2001 | Chen | 192/64 |
| 6,260,681 B1 | * | 7/2001 | Chen | 192/110 B |
| 6,309,028 B1 | * | 10/2001 | Kanehisa et al. | 301/110.5 |

* cited by examiner

*Primary Examiner*—Paul N. Dickson
*Assistant Examiner*—Devon Kramer
(74) *Attorney, Agent, or Firm*—Renner, Otto, Boisselle & Sklar, LLP

(57) ABSTRACT

A freewheeling hub device is adapted to be mounted rotatably on an axle of a bicycle, and includes a hub shell which can be driven by a clockwise rotation of a driving barrel to rotate for forward movement of a bicycle wheel when a coupling socket engages threadedly the driving barrel and engages frictionally the hub shell. A coiled spring is disposed between the hub shell and the coupling socket such that a sudden termination of the clockwise rotation of the driving barrel, while the bicycle wheel continues with the forward movement due to the action of inertia, imparts a force from the hub shell to transmit to and along the coiled spring, which can drive the coupling socket to rotate clockwise to permit screwing-out movement of the coupling socket relative to the driving barrel, thereby disengaging the coupling socket from the hub shell so as not to rotate the driving barrel as well as bicycle pedals and thereby preventing the rider's legs from injury when the bicycle is pulled to move backward using the rider's hands.

2 Claims, 3 Drawing Sheets

FREEWHEELING HUB DEVICE FOR A BICYCLE

BACKGROUND OF THE INVENTION

1. Field of the Invention

This invention relates to a freewheeling hub device for a bicycle, more particularly to a freewheeling hub device which can release the coupling between a sprocket wheel and a hub shell when a sudden termination of the rotation of the sprocket wheel occurs while a bicycle wheel continues moving due to the action of inertia.

2. Description of the Related Art

The freewheel of a bicycle is generally driven by a chain drive through a free-sprocket. In U.S. Pat. No. 5,718,315, a freewheeling hub device includes a hub shell which is connected to the freewheel spokes of a bicycle wheel and which has a through hole to receive a wheel axle, a driving barrel which is sleeved onto the axle and which has an externally threaded end inserted into the hub shell and an opposite end fastened to a sprocket wheel of the bicycle, a coupling socket which is mounted within the hub shell around the axle, and a connecting spring which is mounted within the hub shell around the coupling socket and which engages a sliding member that is slidable along the axle. The coupling socket has an internally threaded portion which is rotated to screw-in the externally threaded end when the driving barrel is rotated with the sprocket wheel, and has a friction wall which frictionally engages the hub shell upon a full threaded engagement of the internally threaded portion for forward movement of the bicycle wheel. When the sprocket wheel is rotated in the opposite direction, the driving barrel is synchronously rotated, thereby causing the screw-out movement of the coupling socket to disengage from the hub shell so as to result in idle running of the sprocket wheel.

As such, when the rotation of the sprocket wheel for forward movement of the bicycle wheel is terminated (i.e. the rider stops turning the pedals of the bicycle), and when the bicycle is pulled to move backward using the rider's hands, since the coupling socket remains in engagement with the hub shell, the driving barrel, as well as the pedals, is also rotated with the hub shell, thereby resulting in a tendency to injury the rider's legs.

SUMMARY OF THE INVENTION

The object of the present invention is to provide a freewheeling hub device in which the driving barrel is disengaged from the hub shell once the rotation of the driving barrel for forward movement of the bicycle is suddenly terminated while the bicycle wheel continues moving due to the action of inertia, thereby resulting in idle running of the hub shell without rotating the driving barrel as well as the pedals.

According to this invention, the freewheeling hub device includes a hub shell, a driving barrel, a coupling socket, a sliding member, a connecting spring, and a coiled spring which are adapted to be mounted rotatably on an axle of a bicycle. The hub shell has first and second lateral ends which are disposed opposite to each other in an axial direction parallel to the axle, and an inner peripheral wall which extends in the axial direction to communicate the first and second lateral ends and which defines a through hole. The inner peripheral wall has a first wall portion and a second wall portion respectively proximate to the first and second lateral ends, and an intermediate wall portion which is disposed between the first and second wall portions and which defines a shoulder. The driving barrel is rotatable relative to the hub shell, and includes a head portion which is disposed outwardly of the first lateral end and which is adapted to be rotated with a sprocket wheel of the bicycle, and an externally threaded portion which is disposed opposite to the head portion in the axial direction and which extends into the through hole so as to be located at the intermediate wall portion. The coupling socket is disposed rotatably and movably in the through hole in the axial direction, and includes a coupling end and an engaging end opposite to each other in the axial direction. The engaging end has a friction wall which confronts the intermediate wall portion, and an internally threaded portion which is disposed opposite to the friction wall in a direction radial to the axial direction to be movable in the axial direction between a fully engaged position, where the externally threaded portion is in a full threaded engagement with the internally threaded portion as a result of a clockwise rotation of the driving barrel relative to the coupling socket, which corresponds to a forward movement of the bicycle wheel, and the friction wall is frictionally engaged with the intermediate wall portion as a result of the full threaded engagement, and a partially engaged position, where the externally threaded portion is in a partial threaded engagement with the internally threaded portion as a result of a screwing-out movement of the internally threaded portion relative to the externally threaded portion, and the friction wall is disengaged from the intermediate wall portion. The sliding member is adapted to sleeve on the axle, and is movable in the axial direction. The connecting spring is mounted in the through hole, and interconnects the coupling socket and the sliding member. The coiled spring is mounted in the through hole, and includes a securing end which is connected to the coupling end of the coupling socket, and an abutting end which is disposed opposite to the securing end in the axial direction and which abuts against the shoulder. Thus, a sudden termination of the clockwise rotation of the driving barrel, while the bicycle wheel continues with the forward movement due to the action of inertia, imparts a force to the abutting end, which is subsequently transmitted along the coiled spring to the securing end so as to drive the coupling socket to rotate in the clockwise direction to permit the screwing-out movement of the internally threaded portion relative to the externally threaded portion, thereby placing the internally threaded portion in the partially engaged position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
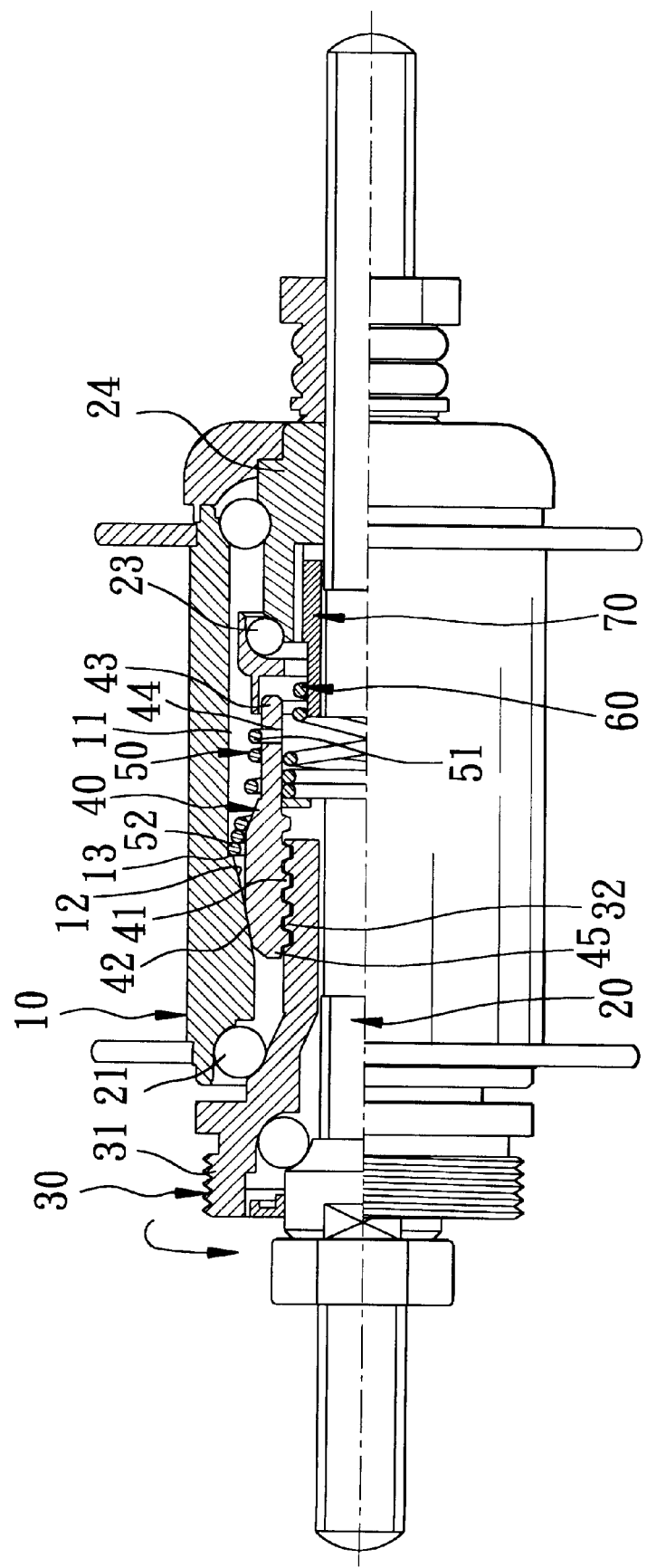
FIG. 1 is a partly sectional view of a preferred embodiment of a freewheeling hub device according to this invention in a full threaded engagement state.
Figure 2:
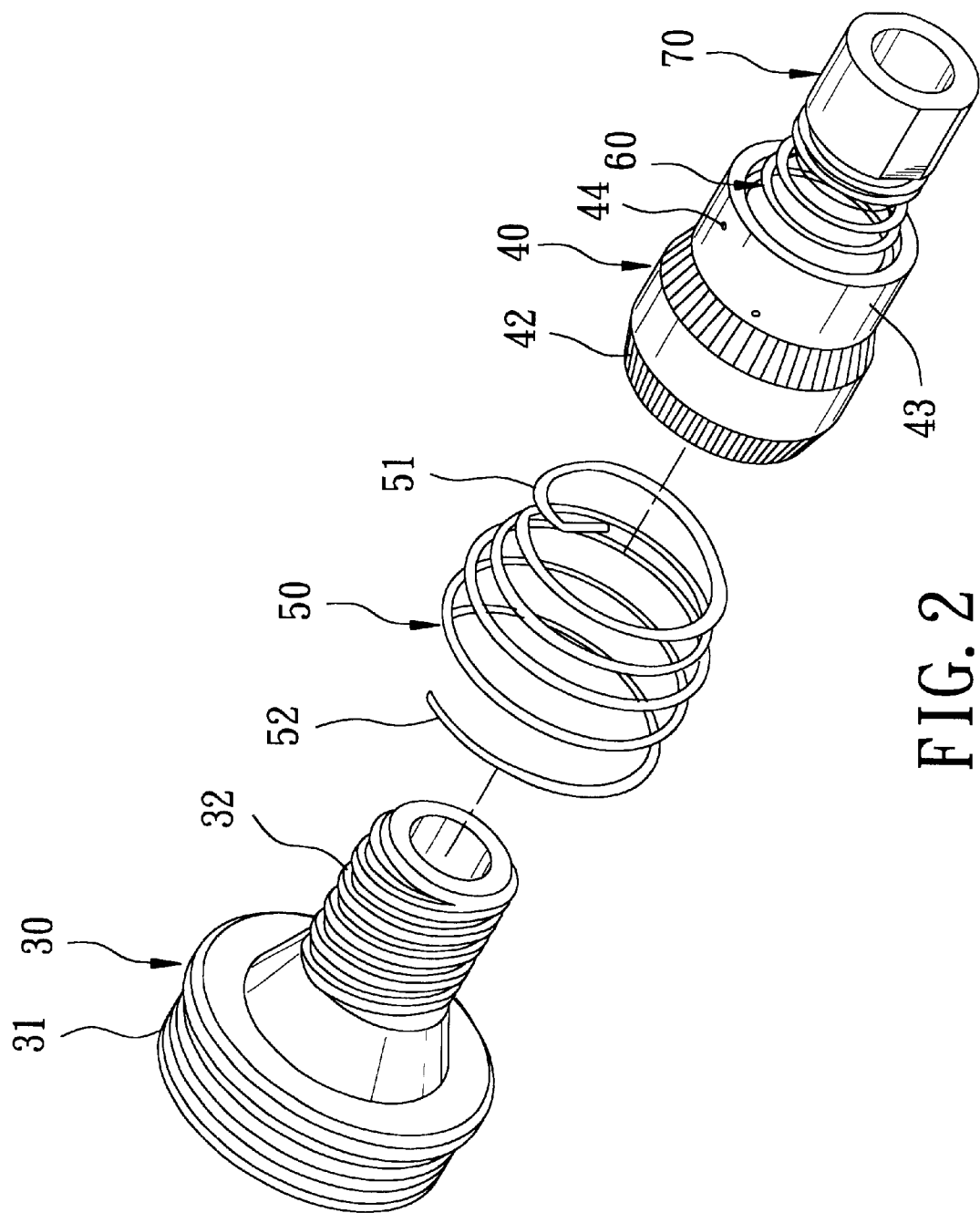
FIG. 2 is an exploded perspective view of a driving barrel, a torsion spring, and a coupling socket of the preferred embodiment.

Referring to FIGS. 1 and 2, the preferred embodiment of the freewheeling hub device according to the present invention is shown to comprise a hub shell 10, a driving barrel 30, a coupling socket 40, a sliding member 70, a connecting spring 60, and a coiled spring 50 which are adapted to be mounted rotatably on an axle 20 of a bicycle (not shown) by a plurality of ball bearing members 21, 23.

The hub shell 10 is adapted to be connected to the freewheel spokes of a bicycle wheel (not shown), and has first and second lateral ends which are disposed opposite to each other in an axial direction, and an inner peripheral wall which extends in the axial direction to communicate the first and second lateral ends and which defines a through hole 11. The inner peripheral wall has a first wall portion and a second wall portion respectively proximate to the first and second lateral ends, and an intermediate wall portion 12 which is disposed between and which converges gradually from the first to second wall portions and which defines a shoulder 13.

The driving barrel 30 is rotatable relative to the hub shell 10, and includes a head portion 31 which is disposed outwardly of the first lateral end of the hub shell 10 and which is adapted to be rotated with a sprocket wheel (not shown) of the bicycle to couple with the pedals, and an externally threaded portion 32 which is disposed opposite to the head portion 31 in the axial direction and which extends into the through hole 11 so as to be located at the intermediate wall portion 12.

Figure 3:
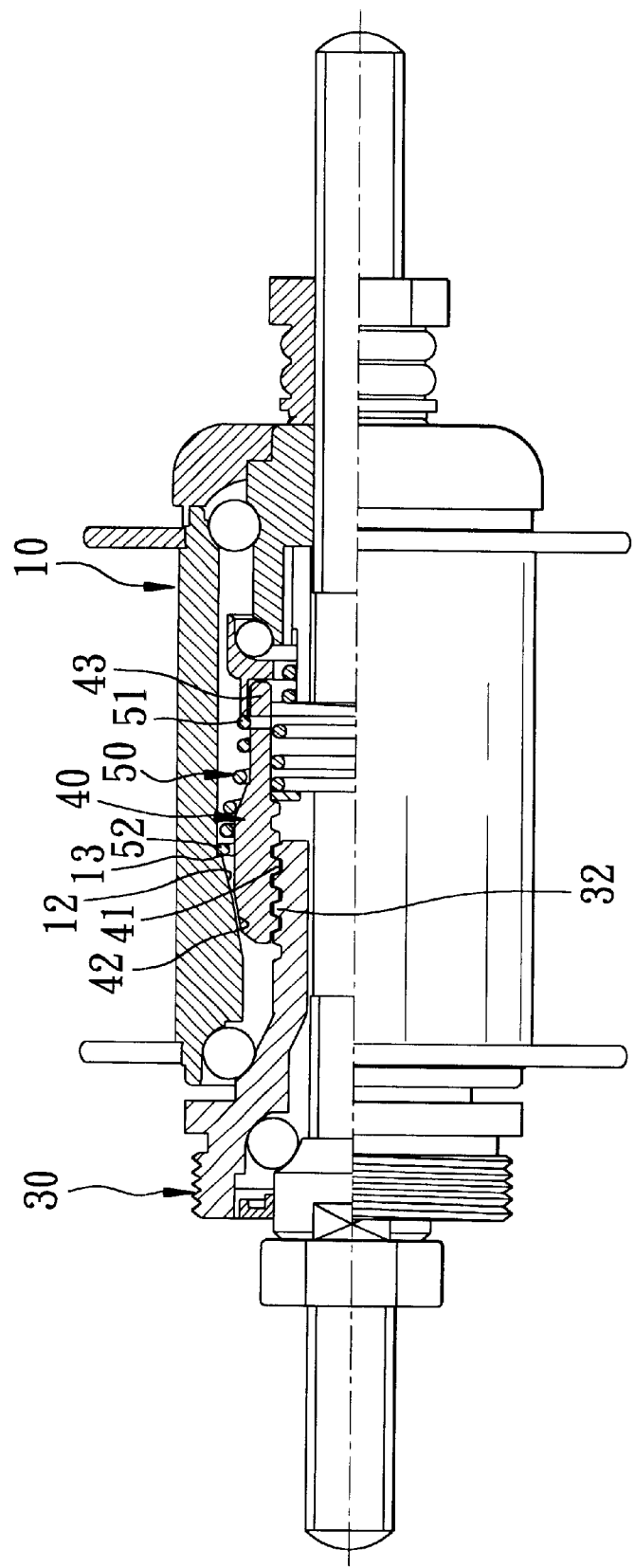
FIG. 3 is a partly sectional view of the preferred embodiment in a partial threaded engagement state.

The coupling socket 40 is disposed rotatably and movably in the through hole 11 in the axial direction, and includes a coupling end 43 and an engaging end 45 opposite to each other in the axial direction. The engaging end 45 has a tapered friction wall 42 which confronts the intermediate wall portion 12, and an internally threaded portion 41 which is disposed opposite to the friction wall 42 in a direction radial to the axial direction to be movable in the axial direction between a fully engaged position, as shown in FIG. 1, where the externally threaded portion 32 of the driving barrel 30 is in a full threaded engagement with the internally threaded portion 41 as a result of a clockwise rotation of the driving barrel 30 relative to the coupling socket 40 (as indicated by the arrow in FIG. 1), which corresponds to a forward movement of the bicycle wheel, and the friction wall 42 is frictionally engaged with the intermediate wall portion 12 as a result of the full threaded engagement, and a partially engaged position, as shown in FIG. 3, where the externally threaded portion 32 of the driving barrel 30 is in a partial threaded engagement with the internally threaded portion 41 as a result of a screwing-out movement of the internally threaded portion 41 relative to the externally threaded portion 32 due to a counterclockwise rotation of the driving barrel 30, and the friction wall 42 is disengaged from the intermediate wall portion 12, thereby resulting in idle running of the hub shell 10.

The sliding member 70 is adapted to sleeve on the axle 20, and is slidable in the axial direction. The connecting spring 60 is mounted in the through hole 11, and has one end which is connected to the coupling socket 40, and an opposite end which is connected to the sliding member 70 that is stopped by a cup 24.

The coiled spring 50 is mounted in the through hole 11, and includes a securing end 51 which is connected to an insert hole 44 in the coupling end 43 of the coupling socket 40, and an abutting end 52 which is disposed opposite to the securing end 51 in the axial direction and which abuts against the shoulder 13. In addition, the coiled spring 50 extends in the clockwise direction from the abutting end 52 to the securing end 51, and has a curvature radius which is gradually enlarged from the securing end 51 to the abutting end 52. In the fully engaged position, the coiled spring 50 is compressed. As such, when it is desired to stop the bicycle wheel, a sudden termination of the clockwise rotation of the driving barrel 30, while the bicycle wheel, as well as the hub shell 10, continues with the forward movement due to the action of inertia, imparts a force to the abutting end 52 of the coiled spring 50, which is subsequently transmitted along the coiled spring 50 to the securing end 51 so as to drive the coupling socket 40 to rotate in the clockwise direction to permit the screwing-out movement of the internally threaded portion 41 relative to the externally threaded portion 32, thereby placing the internally threaded portion 41 in the partially engaged position. Therefore, before the complete braking of the bicycle, the coupling socket 40 has been disengaged from the hub shell 10 so as to cause idle running of the hub shell 10, thereby resulting in non-rotation of the driving barrel 30 as well as the bicycle pedals and thereby preventing the rider's legs from injury when the bicycle is pulled to move backward using the rider's hands.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A freewheeling hub device for a bicycle which includes an axle extending in an axial direction, a sprocket wheel mounted coaxially around and rotatably relative to the axle, and a bicycle wheel which is mounted on said freewheeling hub device for rotation, said freewheeling hub device comprising:

a hub shell adapted to be rotatably mounted on the axle, and having first and second lateral ends which are disposed opposite to each other in the axial direction, and an inner peripheral wall which extends in the axial direction to communicate said first and second lateral ends and which defines a through hole, said inner peripheral wall having a first wall portion and a second wall portion respectively proximate to said first and second lateral ends, and an intermediate wall portion which is disposed between said first and second wall portions and which defines a shoulder;

a driving barrel adapted to be rotatably mounted on the axle and rotatable relative to said hub shell, said driving barrel including a head portion which is disposed outwardly of said first lateral end and which is adapted to be rotated with the sprocket wheel, and an externally threaded portion which is disposed opposite to said head portion in the axial direction and which extends into said through hole so as to be located at said intermediate wall portion;

a coupling socket disposed rotatably and movably in said through hole in the axial direction, and adapted to be rotatably mounted around the axle, said coupling socket including an engaging end which has a friction wall that confronts said intermediate wall portion, and an internally threaded portion that is disposed opposite to said friction wall in a direction radial to the axial direction to be movable in the axial direction between a fully engaged position, where said externally threaded portion is in a full threaded engagement with said internally threaded portion as a result of a clockwise rotation of said driving barrel relative to said coupling socket, which corresponds to a forward movement of the bicycle wheel, and said friction wall is frictionally engaged with said intermediate wall portion as a result of said full threaded engagement, and a partially engaged position, where said externally threaded portion is in a partial threaded engagement with said internally threaded portion as a result of a screwing-out movement of said internally threaded portion relative to said externally threaded portion, and said friction wall is disengaged from said intermediate wall portion, and a coupling end disposed opposite to said engaging end in the axial direction away from said driving barrel;

a sliding member adapted to sleeved on the axle, and movable in the axial direction;

a connecting spring mounted in said through hole and adapted to be disposed around the axle, and interconnecting said coupling socket and said sliding member; and a coiled spring mounted in said through hole and adapted to be disposed around the axle, said coiled spring including a securing end which is connected to said coupling end of said coupling socket, and an abutting end which is disposed opposite to said securing end in the axial direction and which abuts against said shoulder such that a sudden termination of the clockwise rotation of said driving barrel, while the bicycle wheel continues with the forward movement due to the action of inertia, imparts a force to said abutting end, which is subsequently transmitted along said coiled spring to said securing end so as to drive said coupling socket to rotate in the clockwise direction to permit the screwing-out movement of said internally threaded portion relative to said externally threaded portion, thereby placing said internally threaded portion in the partially engaged position.

2. The freewheeling hub device of claim 1, wherein said coiled spring extends in the clockwise direction from said abutting end to said securing end, and has a curvature radius which is gradually enlarged from said securing end to said abutting end.

* * * * *